(12) United States Patent
Kosai et al.

(10) Patent No.: US 12,512,249 B2
(45) Date of Patent: *Dec. 30, 2025

(54) HIGH POWER STACKED FLUX CANCELLING INDUCTOR

(71) Applicant: Government of the United States, as represented by the Secretary of the Air Force, Wright-Patterson AFB, OH (US)

(72) Inventors: Hiroyuki Kosai, Beavercreek, OH (US); James D. Scofield, Whittier, NC (US); Tyler W Bixel, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 695 days.

This patent is subject to a terminal disclaimer.

(21) Appl. No.: 17/939,058

(22) Filed: Sep. 7, 2022

(65) Prior Publication Data

US 2023/0090214 A1     Mar. 23, 2023

Related U.S. Application Data

(60) Provisional application No. 63/325,186, filed on Mar. 30, 2022, provisional application No. 63/246,933, filed on Sep. 22, 2021.

(51) Int. Cl.
*H01F 27/24*     (2006.01)
*H01F 1/12*     (2006.01)
(Continued)

(52) U.S. Cl.
CPC ............... *H01F 27/24* (2013.01); *H01F 1/12* (2013.01); *H01F 3/10* (2013.01); *H01F 3/14* (2013.01);
(Continued)

(58) Field of Classification Search
CPC ... H01F 27/24; H01F 1/12; H01F 3/10; H01F 3/14; H01F 27/28; H01F 27/2823;
(Continued)

(56) References Cited

U.S. PATENT DOCUMENTS

| 1,862,211 A | 6/1932 | Dowling |
| 4,257,087 A * | 3/1981 | Cuk .................... H02M 3/005 363/16 |

(Continued)

FOREIGN PATENT DOCUMENTS

WO    2009158230 A1    12/2009

OTHER PUBLICATIONS

U.S. Appl. No. 17/939,070.
U.S. Appl. No. 17/939,077.
U.S. Appl. No. 17/939,086.

*Primary Examiner* — Tuyen T Nguyen
(74) *Attorney, Agent, or Firm* — AFMCLO/JAZ; Richard M. Mescher (57) ABSTRACT

The present invention relates high power stacked flux cancelling inductors and processes of making and using same. When properly configured and wired, such inductors separate the AC component and DC component of a high power current thus allowing the smaller AC fraction of the overall current to be carried by much smaller cross-sectional litz wires. Such high power stacked flux cancelling inductors are more efficient at avoiding core saturation compared to standard inductors, yet they are less expensive without the need for large cross-sectional litz AC carrying wires. In addition to the aforementioned benefits, such high power stacked flux cancelling inductor permits the levels of AC and DC current to be efficiently monitored as such currents are separated.

23 Claims, 10 Drawing Sheets

(51) Int. Cl.
*H01F 3/10* (2006.01)
*H01F 3/14* (2006.01)
*H01F 27/28* (2006.01)
*H01F 27/30* (2006.01)
*H01F 27/34* (2006.01)
*H01F 41/071* (2016.01)

(52) U.S. Cl.
CPC ......... *H01F 27/28* (2013.01); *H01F 27/2823* (2013.01); *H01F 27/306* (2013.01); *H01F 27/34* (2013.01); *H01F 41/071* (2016.01)

(58) Field of Classification Search
CPC ...... H01F 27/306; H01F 27/34; H01F 41/071; H01F 1/15308; H01F 1/344; H01F 37/00
USPC .................. 336/212, 229, 233–234
See application file for complete search history.

(56) References Cited

U.S. PATENT DOCUMENTS

| | | |
|---|---|---|
| 4,274,133 A | 6/1981 | Cuk et al. |
| 4,674,019 A | 6/1987 | Martinelli |
| 4,703,409 A | 10/1987 | Spreen |
| 5,353,212 A | 10/1994 | Loftus, Jr. |
| 5,528,205 A | 6/1996 | Wong |
| 5,790,005 A | 8/1998 | Santi et al. |
| 6,693,805 B1 | 2/2004 | Steigerwald et al. |
| 6,998,964 B2 | 2/2006 | Lomax, Jr. et al. |
| 7,016,205 B2 | 3/2006 | Steigerwald et al. |
| 7,965,165 B2 | 6/2011 | Ikriannikov et al. |
| 8,040,704 B2 | 10/2011 | Cuk |
| 8,427,120 B1 | 4/2013 | Cilio |
| 8,823,352 B2 | 9/2014 | Zhang |
| 9,406,419 B2 * | 8/2016 | Njiende T ............... H01F 41/02 |
| 9,799,440 B2 | 10/2017 | Inoue et al. |
| 2004/0032315 A1 | 2/2004 | Illingworth |

\* cited by examiner

HIGH POWER STACKED FLUX CANCELLING INDUCTOR

CROSS-REFERENCE TO RELATED APPLICATION

The present application claims priority to U.S. Provisional Application Ser. No. 63/325,186 filed Mar. 30, 2022, and U.S. Provisional Application Ser. No. 63/246,933 filed Sep. 22, 2021, the contents of both such provisional applications hereby being incorporated by reference in their entry.

RIGHTS OF THE GOVERNMENT

The invention described herein may be manufactured and used by or for the Government of the United States for all governmental purposes without the payment of any royalty.

FIELD OF THE INVENTION

The present invention relates to high power stacked flux cancelling inductors and processes of making and using same.

BACKGROUND OF THE INVENTION

Inductors are one of the heaviest and largest volume components in high power DC-DC converter and DC-AC inverter power electronic applications. Comprised of a soft magnetic core material and multiple turns of copper current carrying windings, inductors have power handling limitations based on both winding and core material fundamental properties. Under high current and high voltage operation, an inductor's core is subjected to very high magnetic fields (H) and may eventually saturate due to the high current and high voltage conditions. Saturation conditions define an upper limit on the power level that can be processed by a converter or power supply. In order to mitigate saturation conditions during converter operation, magnetic core cross-sectional area is increased and/or an air gap is introduced in the core's magnetic flux pathway. In addition, under high frequency and high current operations, skin depth considerations necessitate costly litz windings be used that consist of multi-strand wire weaved into the required gauge for the targeted power level. In some cases, these braided wires utilize more than one thousand strands of extremely fine magnet wires for very high frequency applications. Due to core saturation and winding wire frequency limitations, traditional high power inductors are made of large cores and are wound with litz wire resulting in inductors that dominate the cost, volume, and weight of inverter, power supply, and converter components. The subject invention not only provides a solution to both the need for high cost litz magnet wires but also mitigates core saturation limits and the need for large volume inductor cores. Inductors fabricated using the invention design paradigm result in energy storage devices that can be much reduced in size and cost.

Conventional geometry inductors have long been used for high voltage high power DC-DC converter applications. For high power, high frequency applications, conventional inductors must use large cross-sectional litz wires that consists very fine magnet wires to prevent the losses due to the skin depth effect, and the large cross sectional inductor cores to prevent core saturation. Applicants recognized that the AC component of the current drove the need to use such large cross-sectional litz wires. As a result of such recognition, Applicants discovered that by properly configuring and wiring an inductor, the AC component and DC component of a high power current could be separated and that the separated AC component was a smaller fraction of the overall current. As the AC component was a smaller separated component of the overall current, such AC component could be handled by much smaller cross-sectional litz wires. As a result, Applicants' high power stacked flux cancelling inductor avoids core saturation, is much less expensive, has a more compact core, and large cross-sectional litz wires are not required. In addition to the aforementioned benefits, Applicants' high power stacked flux cancelling inductor permits the levels of AC and DC current to be efficiently monitored as such currents are separated.

SUMMARY OF THE INVENTION

The present invention relates high power stacked flux cancelling inductors and processes of making and using same. When properly configured and wired such inductors, separate the AC component and DC component of a high power current thus allowing the smaller AC fraction of the overall current to be carried by much smaller cross-sectional litz wires. Such high power stacked flux cancelling inductors are more efficient at avoiding core saturation compared to standard inductors, yet they are less expensive without the need for large cross-sectional litz AC carrying wires. In addition to the aforementioned benefits, such high power stacked flux cancelling inductor permits the levels of AC and DC current to be efficiently monitored as such currents are separated.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

DETAILED DESCRIPTION OF THE INVENTION

Definitions

Unless specifically stated otherwise, as used herein, the terms "a", "an" and "the" mean "at least one".

As used herein, the terms "include", "includes" and "including" are meant to be non-limiting.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

As used in this specification, the words "about," "approximately," or the like, when accompanying a numerical value, are to be construed as indicating a deviation as would be appreciated by one of ordinary skill in the art to operate satisfactorily for an intended purpose.

As used in this specification, the words "and/or" means, when referring to embodiments (for example an embodiment having elements A and/or B) that the embodiment may have element A alone, element B alone, or elements A and B taken together.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Figure 1:
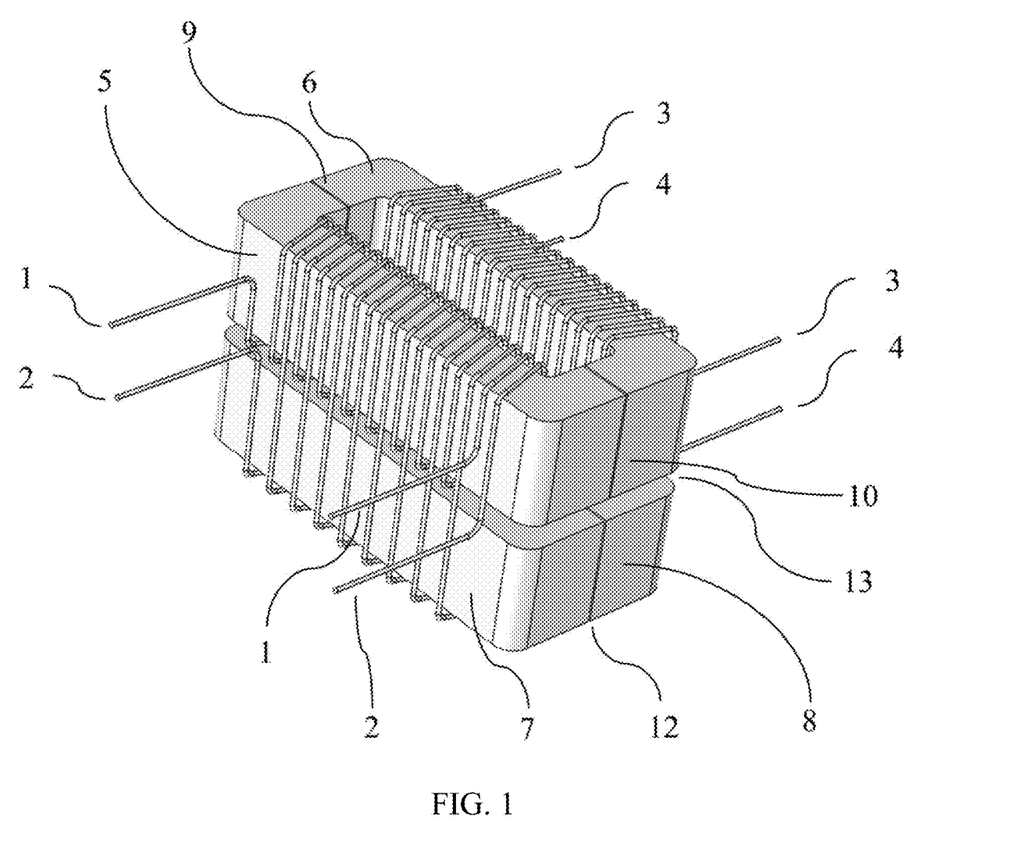
FIG. 1 is an isometric view from one embodiment of a high power stacked flux cancelling inductor.

FIG. 1 depicts an isometric view of a first embodiment of a high power stacked flux cancelling inductor comprising a first winding (1), a second winding (2), a third winding (3), a fourth winding (4), a first core piece 1A (5), a second core piece 1B (6), a third core piece 2A (7), a fourth core piece 2B (8), a first gap (9), a second gap (10), a fourth gap (12) and a space for winding turn passage (13).

Figure 2:
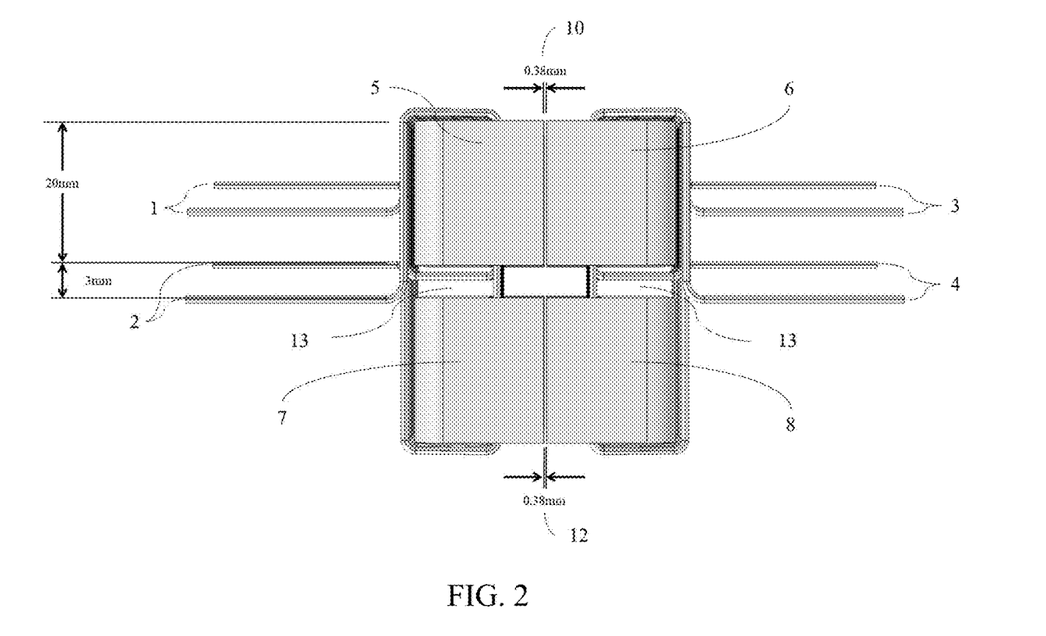
FIG. 2 is a side view from one embodiment of a high power stacked flux cancelling inductor.

FIG. 2 depicts a side view of the high power stacked flux cancelling inductor according to FIG. 1 showing first winding (1), second winding (2), third winding (3), fourth winding (4), a first core piece 1A (5), a second core piece 1B (6), a third core piece 2A (7), a fourth core piece 2B (8), a second gap (10), a fourth gap (12) and a space for winding turn passage (13).

Figure 3:
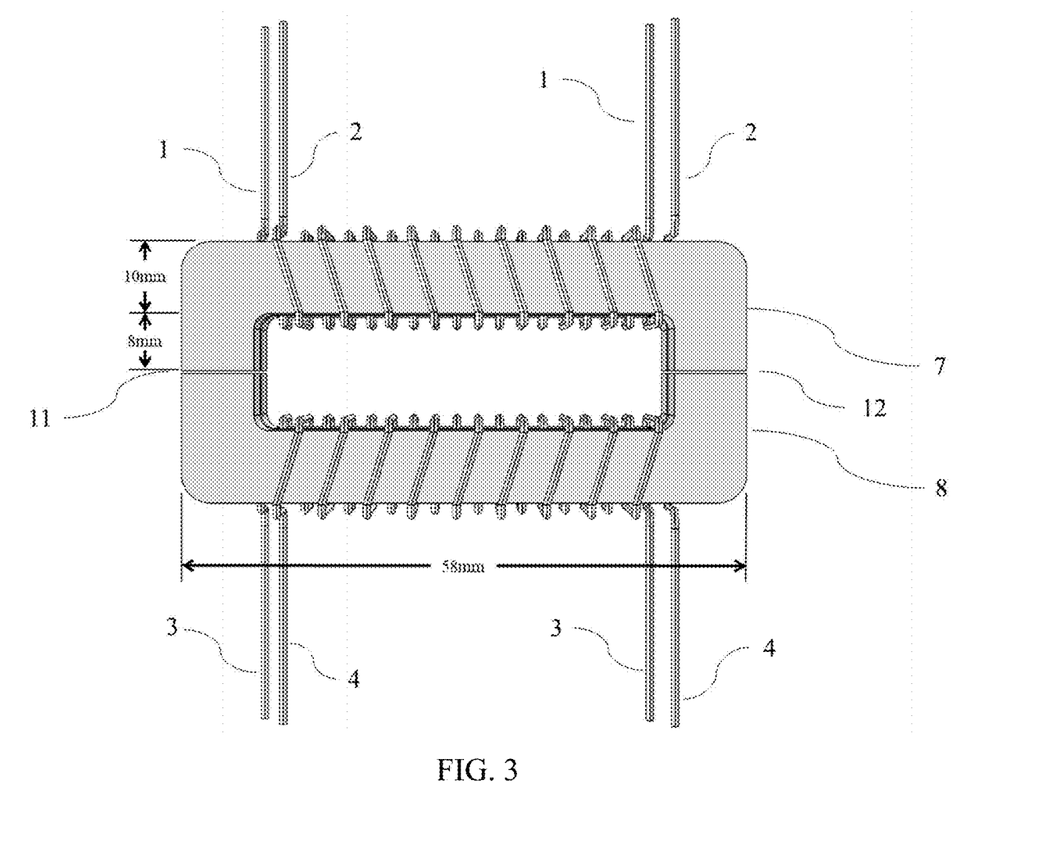
FIG. 3 is a bottom view from one embodiment of a high power stacked flux cancelling inductor.

FIG. 3 depicts a bottom view of the high power stacked flux cancelling inductor according to FIG. 1 showing first winding (1), second winding (2), third winding (3), fourth winding (4), third core piece 2A (7), fourth core piece 2B (8), third gap (11), and a fourth gap (12).

Figure 4:
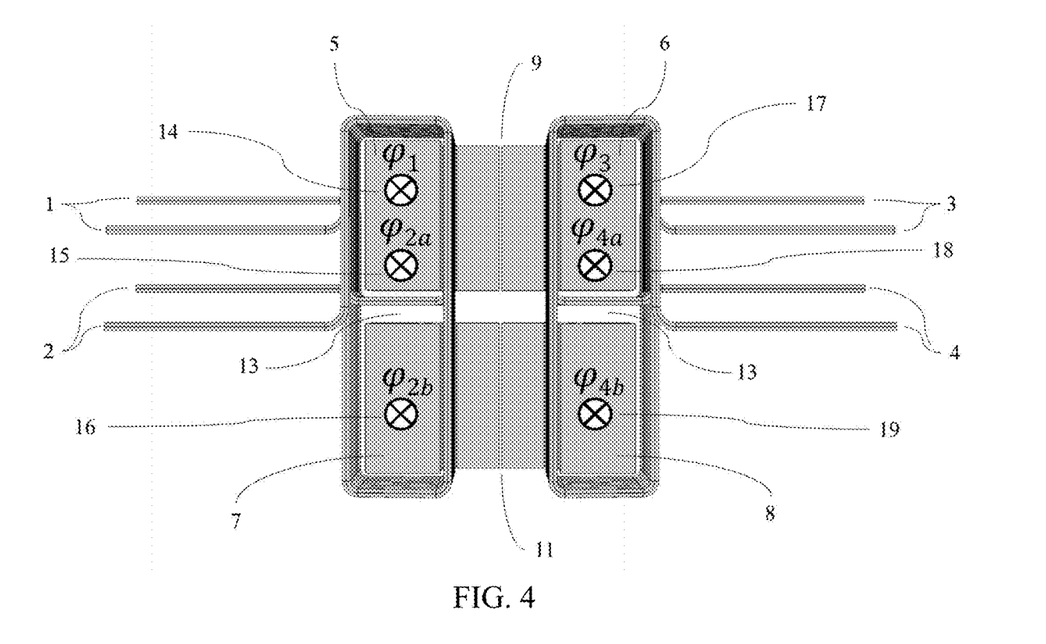
FIG. 4 is a view of a cross section of the cores with direction of the DC flux from one embodiment of a high power stacked flux cancelling inductor.
Figure 5:
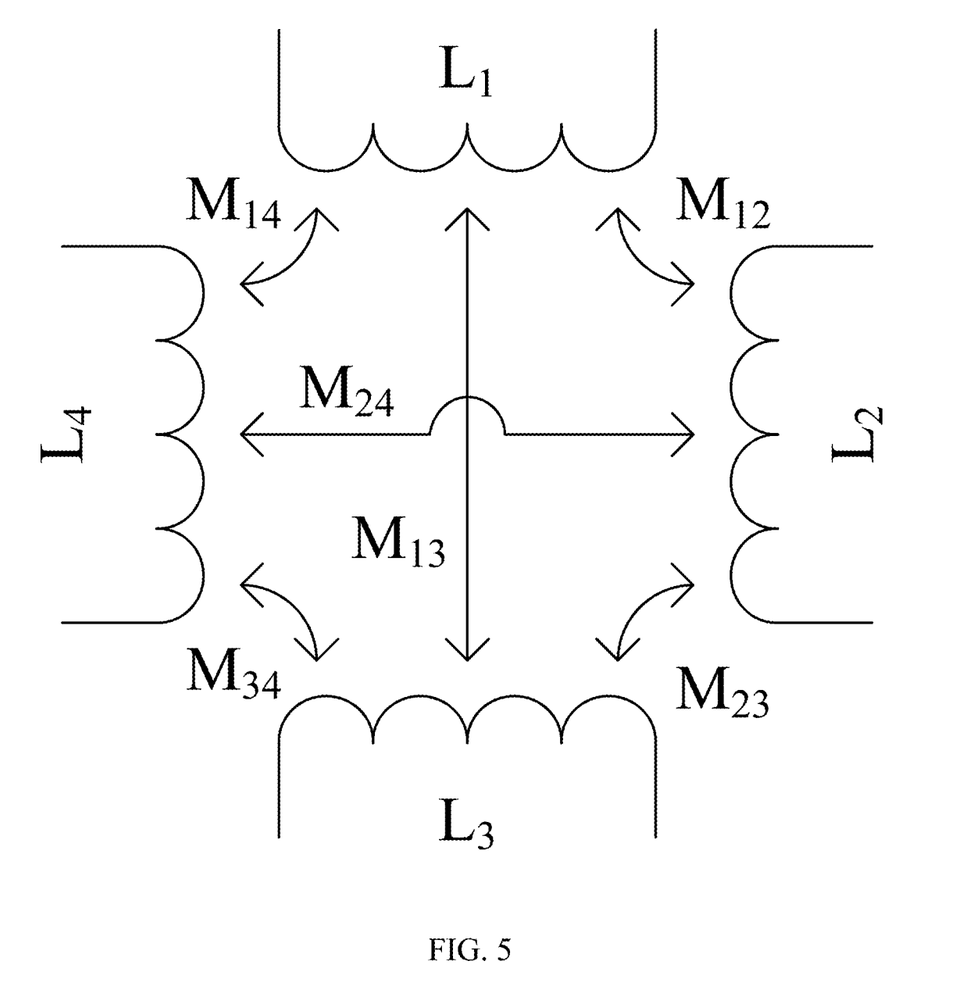
FIG. 5 illustrates the magnetic relationships of the four windings included in the high power stacked flux cancelling inductor.
Figure 6:
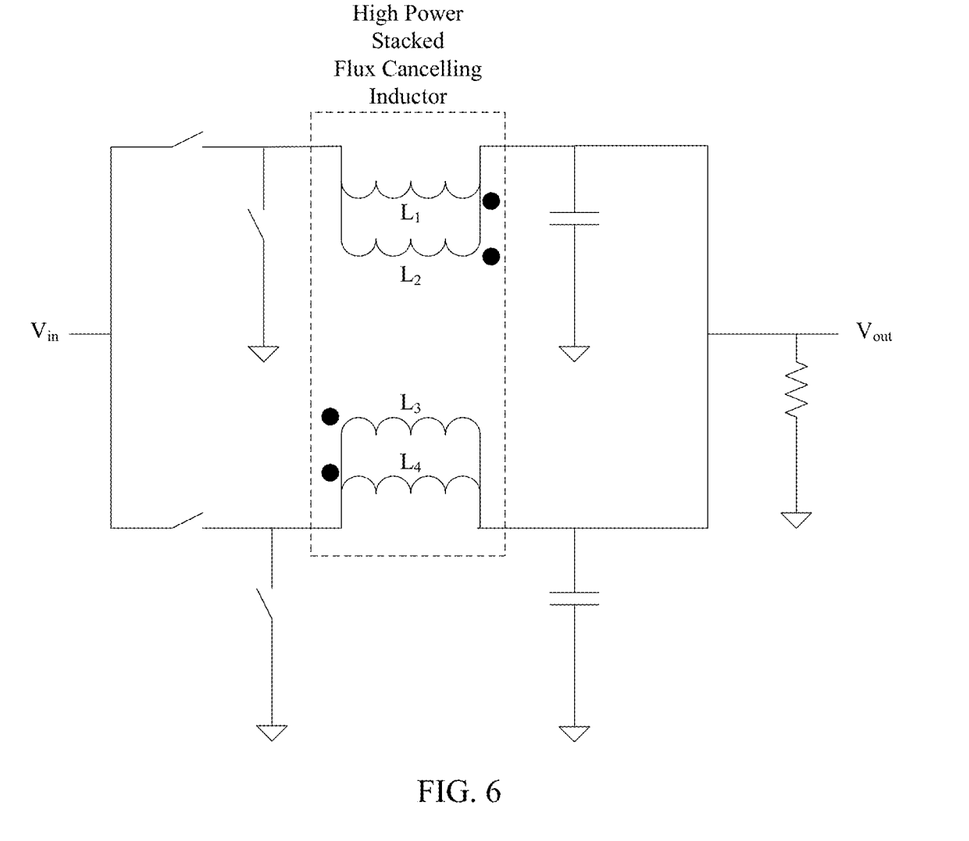
FIG. 6 is an example two-phase buck converter circuit utilizing a high power stacked flux cancelling inductor.
Figure 7:
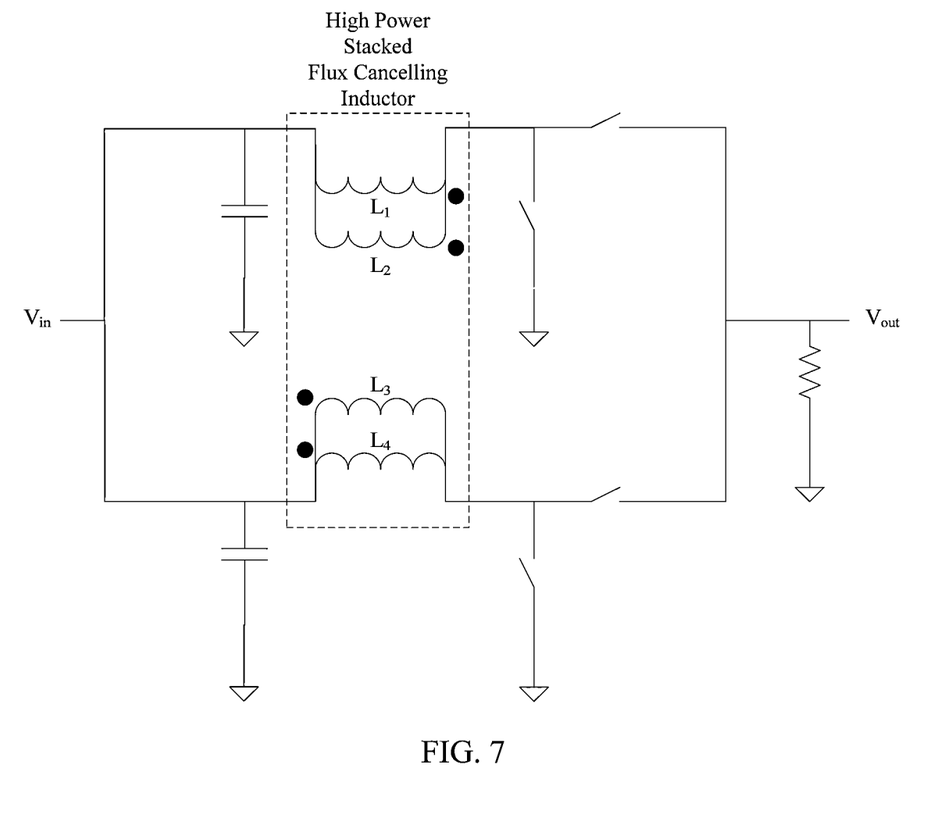
FIG. 7 is an example two-phase boost converter circuit utilizing a high power stacked flux cancelling inductor.
Figure 8:
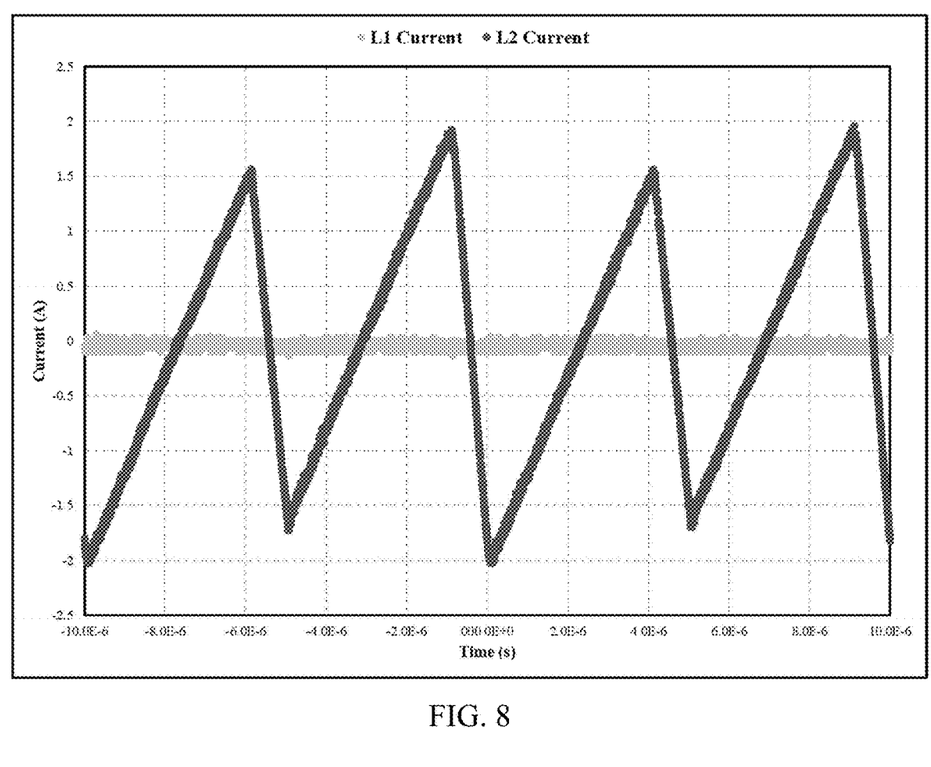
FIG. 8 illustrates the current signals through one-half of a high power stacked flux cancelling inductor.
Figure 9:
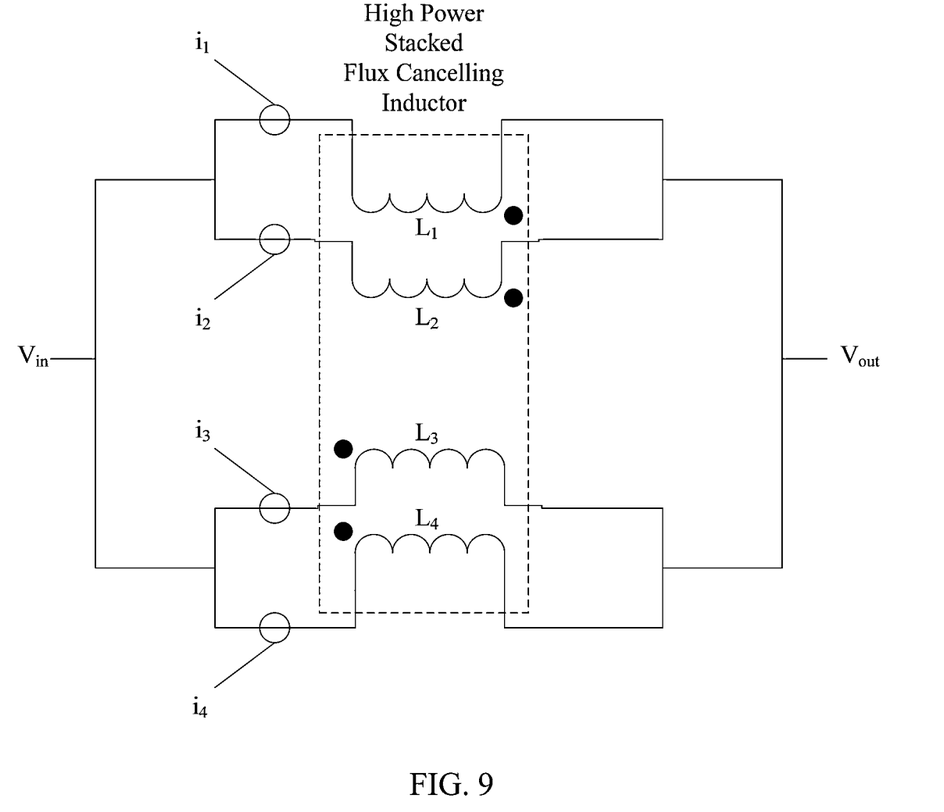
FIG. 9 is an example of current sensing utilizing a high power stacked flux cancelling inductor in parallel configuration.
Figure 10:
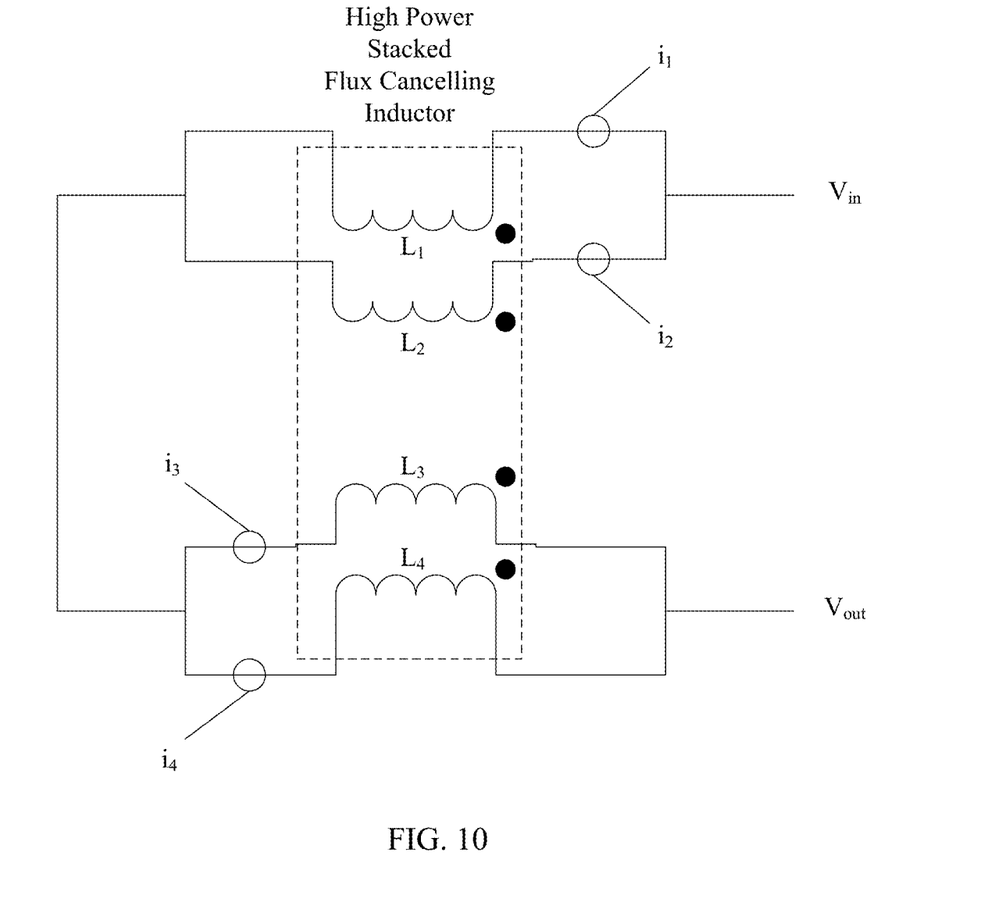
FIG. 10 is an example of current sensing utilizing a high power stacked flux cancelling inductor in series configuration.

FIG. 4 depicts a section view of the high power stacked flux cancelling inductor according to FIG. 1 showing first winding (1), second winding (2), third winding (3), fourth winding (4), first core piece 1A (5), second core piece 1B (6), third core piece 2A (7), fourth core piece 2B (8), first gap (9), third gap (11), a space for winding turn passage (13), a flux in core piece 1A (14) induced from first winding (1), a flux in core piece 1A (15) induced from second winding (2), a flux in core piece 2A (16) induced from second winding (2), a flux in core piece 1B (17) induced from third winding (3), a flux in core piece 1B (18) induced from fourth winding (4), and a flux in core piece 2B (19) induced from fourth winding (4).

High Power Stacked Flux Cancelling Inductors and Article Comprising Same

For purposes of this specification, headings are not considered paragraphs and thus this paragraph is paragraph twenty-nine of the present specification. The individual number of each paragraph above and below this paragraph can be determined by reference to this paragraph's number. In this paragraph twenty-nine, Applicants disclose an inductor comprising a) a first core comprising a core piece 1A and a core piece 1B and a second core comprising a core piece 2A and a core piece 2B, said first core being stacked on said second core, and separated from said second core by a dielectric material, said inductor comprising a gap between Core piece 1A and Core piece 1B and a gap between Core piece 2A and Core piece 2B; and b) a first winding, a second winding, a third winding and a fourth winding, two of said four windings being bulk AC conducting windings and the remaining two of said four windings being bulk DC conducting windings; and when a current comprising a DC current and an AC current is supplied to said inductor, said bulk DC conducting windings conducting at least 51%, preferably at least 70%, more preferably at least 90%, most preferably at least 95% of said DC current or from about 51% to about 99% of said DC current and said bulk AC conducting windings conducting at least 51%, preferably at least 70%, more preferably at least 90%, most preferably at least 99% of said AC current or from about 51% to about 99.99% of said AC current and any of said current's DC current not conducted by said bulk DC conducting windings, said bulk DC conducting windings conducting any of said current's AC current not conducted by said bulk AC conducting windings; said windings each independently having a resistivity at 20° C. of from about $1.5 \times 10^{-8}$ Ohm-m to about $1.1 \times 10^{-6}$ Ohm-m, preferably said windings each independently having a resistivity at 20° C. of from about $1.5 \times 10^{-8}$ Ohm-m to about $4.2 \times 10^{-7}$ Ohm-m, more preferably said windings each independently having a resistivity at 20° C. of from about $1.5 \times 10^{-8}$ Ohm-m to about $1.4 \times 10^{-7}$ Ohm-m, most preferably said windings each independently having a resistivity at 20° C. of from about $1.5 \times 10^{-8}$ Ohm-m to about $3.0 \times 10^{-8}$ Ohm-m, said windings being wound around said cores such that the following inductor conditions are met:

Equation For Said First Winding $$V_1 = L_1 \frac{di_1}{dt} + M_{12} \frac{di_2}{dt} - M_{13} \frac{di_3}{dt} - M_{14} \frac{di_4}{dt}$$

Equation For Said Second Winding $$V_1 = M_{12} \frac{di_1}{dt} + L_2 \frac{di_2}{dt} - M_{23} \frac{di_3}{dt} - M_{24} \frac{di_4}{dt}$$

Equation For Said Third Winding $$V_2 = -M_{13} \frac{di_1}{dt} - M_{23} \frac{di_2}{dt} + L_3 \frac{di_3}{dt} + M_{34} \frac{di_4}{dt}$$

Equation For Said Fourth Winding

-continued $$V_2 = -M_{14}\frac{di_1}{dt} - M_{24}\frac{di_2}{dt} + M_{34}\frac{di_3}{dt} + L_4\frac{di_4}{dt}$$

wherein for said equations the variables are defined as follows:
$V_1$ is a voltage across said first Winding;
$V_1$ is a voltage across said second Winding;
$V_2$ is a voltage across said third Winding;
$V_2$ is a voltage across said fourth Winding;
$i_1$ is a current in said first Winding;
$i_2$ is a current in said second Winding;
$i_3$ is a current in said third Winding;
$i_4$ is a current in said fourth Winding;
$L_1$ is a self inductance of said first Winding around said Core piece 1A;
$L_2$ is a self inductance of said second Winding around said piece Core piece 1A and said Core piece 2A;
$L_3$ is a self inductance of said third Winding around said Core piece 1B;
$L_4$ is the self inductance of said fourth Winding around said Core piece 1B and said Core piece 2B;
$M_{12}$ is a mutual inductance between said first Winding and said second Winding;
$M_{13}$ is a mutual inductance between said first Winding and said third Winding;
$M_{14}$ is a mutual inductance between said first Winding and said fourth Winding;
$M_{23}$ is a mutual inductance between said second Winding and said third Winding;
$M_{24}$ is a mutual inductance between said second Winding and said fourth Winding;
$M_{34}$ is a mutual inductance between said third Winding and said fourth Winding;
and said self and mutual inductances for said inductor satisfying one of the following set of conditions: Criteria 1 and Criteria 1a; Criteria 1 and Criteria 1b; Criteria 2 and Criteria 2a; or Criteria 2 and Criteria 2b; wherein said Criteria 1, Criteria 1a, Criteria 1b, Criteria 2, Criteria 2a, and Criteria 2b are as follows:

$L - M_{12} \neq 0$, $M_{13} - M_{14} \neq 0$, and $\frac{di_1}{dt} = \frac{di_3}{dt} = 0$ (Criteria 1)

If $V_1 \neq V_2$, then $\frac{di_2}{dt}$ and $\frac{di_4}{dt}$ are different values and: $(M_{12} - L_2) = (M_{14} - M_{24}) = 0$ (Criteria 1a)

If $V_1 = V_2$, (Criteria 1b)

then $\frac{di_2}{dt} = \frac{di_4}{dt}$ and: $(M_{12} - L_2) = (M_{14} - M_{24})$ or $M_{12} - L_2 \neq 0$, $M_{14} - M_{24} \neq 0$, and $\frac{di_2}{dt} = \frac{di_4}{dt} = 0$ (Criteria 2)

If $V_1 \neq V_2$, then $\frac{di_1}{dt}$ and $\frac{di_3}{dt}$ are different values and: $(L_1 - M_{12}) = (M_{13} - M_{14}) = 0$ (Criteria 2a)

If $V_1 = V_2$, (Criteria 2b)

then $\frac{di_2}{dt} = \frac{di_4}{dt}$ and: $(L_1 - M_{12}) = (M_{13} - M_{14})$.

The skilled artisan will understand that Criteria 1, 1a, 1b, 2, 2a and 2b are ideal in that they provide an acceptable set of criteria without undue mathematical complexity.

Applicants disclose the inductor of paragraph twenty-nine having DC magnetic fluxes induced by said four windings wherein:
a) said core piece 1A having a first DC magnetic flux having a direction induced by one of said two of said four windings and a second DC magnetic flux having a direction induced by one of said two other windings, said one of said two of said four windings and one of said two other windings being wound such that for said inductor the first DC magnetic flux in said core piece 1A induced by one of said two of said four windings is of the same direction as the second DC magnetic flux in Core piece 1A induced by one of said two other windings;
b) said core piece 1B having a first DC magnetic flux having a direction induced by one of said two of said four windings and a second DC magnetic flux having a direction induced by one of said two other windings, said one of said two of said four windings and one of said two other windings and being wound such that for said inductor the first DC magnetic flux in said core piece 1B induced by one of said two of said four windings is of the same direction as the second DC magnetic flux in Core piece 1B induced by one of said two other windings.
c) said Core piece 1A has a total DC magnetic flux having a direction and Core piece 1B has a total DC magnetic flux having a direction and two of said four windings and said two other windings are wound such that for said inductor the DC magnetic flux direction of said total flux induced in Core piece 1A and the DC magnetic flux direction of said total flux induced in Core piece 1B at the gap between Core piece 1A and Core piece 1B are in opposition; and
d) said Core piece 2A has a total DC magnetic flux having a direction and Core piece 2B has a total DC magnetic flux having a direction and two of said four windings and said two other windings being wound such that for said inductor the DC magnetic flux direction of said total flux induced in Core piece 2A and the DC magnetic flux direction of said total flux induced in Core piece 2B at the gap between Core piece 2A and Core piece 2B are in opposition.

Applicants disclose the inductor of paragraphs twenty-nine through thirty wherein said first and second cores comprise a material selected from the group consisting of soft magnetic materials, air and mixtures thereof, preferably said first and second cores comprise a soft magnetic material that comprises a material selected from the group consisting of a ferrimagnetic material, a ferromagnetic material and mixtures thereof, more preferably said first and second cores comprise a material selected from the group consisting of powder metals, solid metals, amorphous metal ribbon, ceramics and mixtures thereof, most preferably said first and second cores comprise a material selected from the group consisting of ferrites, nanocrystalline materials and mixtures thereof.

Applicants disclose the inductor of paragraphs twenty-nine through thirty-one wherein said first, second, third and fourth windings comprise an electrically conductive material, preferably said first, second, third and fourth windings comprise an electrically conductive material selected from the group consisting of metals, superconductors, semiconductors, graphite, conductive polymers and mixtures thereof, more preferably said first, second, third, and fourth windings comprise an electrically conductive material selected from the group consisting of transition metals, post-transition metals, carbon fiber and mixtures thereof, most preferably said first, second, third, and fourth windings comprise an electrically conductive material selected from the group consisting of copper, aluminum, gold, silver and mixtures thereof.

Applicants disclose the inductor of paragraphs twenty-nine through thirty-two said inductor having a DC flux cancellation of from about 20% to about 95%, preferably said inductor has a DC flux cancellation of from about 40% to about 95%, more preferably said inductor has a DC flux cancellation of from about 50% to about 90%, most preferably said inductor has a DC flux cancellation of from about 75% to about 90%.

Applicants disclose the inductor of paragraphs twenty-nine through thirty-three said inductor having a ratio of AC to DC current in each of said bulk AC conducting windings of from about 1:1 to about 1000000:1, preferably said inductor has a ratio of AC to DC current in each of said bulk AC conducting windings from about 2:1 to about 10000:1, more preferably said inductor has a ratio of AC to DC current in each of said bulk AC conducting windings from about 3:1 to about 1000:1, most preferably said inductor has a ratio of AC to DC current in each of said bulk AC conducting windings from about 4:1 to about 100:1.

Applicants disclose an article comprising an inductor according to paragraphs twenty-nine through thirty-four, said article being selected from the group consisting of electrical current measurement or power converter/inverters, preferably said inductor article utilized within electrical generation, conditioning, and distribution subsystems, most preferably said article utilized within vehicle power conditioning subsystems, hybrid and/or electric vehicle charging stations, motor drives, renewable energy conditioning, laser/maser drives, telecommunication transmission power conditioning, or wireless power transmission power conditioning.

This configuration takes advantage of the basic flux cancelling property of a coupled inductor design, particularly for use in power electronic control, conditioning, and distribution equipment, such as DC-DC converter energy storage elements. Such use cases present both saturation (DC) and skin depth (AC) limitations as the electrical power through the inductors contain both DC and AC currents. The major benefit of the invention is the ability to tailor the inductor to specific operating conditions such that a majority of the AC current is conducted only through one winding while the other winding carries a negligible amount of the total AC current. As a result, only one of the windings needs to be made with costly litz wire. In addition, since the subject invention consists of two inductors in one package, internal flux core saturation issues can be mitigated.

The soft magnetic core materials needed to make the disclosed high power stacked flux cancelling inductors can be obtained from Spang & Company, 110 Delta Drive, Pittsburgh, PA 15238, Adams Magnetic Products Company, 888 Larch Avenue, Elmhurst, IL 60126, Dexter Magnetic Technologies, 1050 Morse Avenue, Elk Grove Village, IL 60007, and Hitachi Metals, Ltd., Shinagawa Season Terrace, 2-70, Konan 1-chome, Minato-ku, Tokyo 108-8224, Japan. Winding materials needed to make the disclosed high power stacked flux cancelling inductors can be obtained from: New England Wire Technologies, 130 North Main Street, Lisbon, NH 03585, and MWS Wire Industries, 3000 Camino Del Sol Oxnard, CA 93030

Process of Making an High Power Stacked Flux Cancelling Inductor

Applicant discloses a process of making a high power stacked flux cancelling inductor. Inductor cores are first established per application requirements to meet physical, thermal, and electromagnetic properties. Two sets of paired cores are utilized as illustrated in the example in FIGS. 1, 2, 3, and 4. Four gap locations are shown in the example FIGS. 1, 2, 3 and 4; two gaps separate Core piece 1A and Core piece 1B, and two gaps separate Core piece 2A and Core piece 2B. Core piece 1A and Core piece 1B are symmetric with respect to the gap plane. Core piece 2A and Core piece 2B are symmetric with respect to the gap plane.

The High Power Stacked Flux Cancelling Inductor consists of four windings of which the first Winding and second Winding are electrically connected at the input and output terminals; i.e. the first Winding and second Winding are electrically parallel windings. Likewise the third Winding and fourth Winding are electrically connected at the input and output terminals; i.e. the third Winding and fourth Winding are electrically parallel windings. The first Winding is wound around Core piece 1A where the second Winding is around both Core piece 1A and Core piece 2A. The third Winding is wound around Core piece 1B where the fourth Winding is around both Core piece 1B and Core piece 2B. The number of turns for the first Winding and third Winding are equivalent; likewise, the number of turns for the second Winding and fourth Winding are equivalent.

The first Winding and second Winding are wound in the same orientation. Likewise, the third Winding and fourth Winding are wound in the same orientation. The winding orientations are such that the DC flux induced by each set of cores cancel at the gaps; i.e. DC flux induced in Core piece 1A opposes that of the DC flux induced in Core piece 1B at the gap and DC flux induced in Core piece 2A opposes that of the DC flux induced in Core piece 2B at the gap.

The AC current through each winding can be controlled by one of the criteria listed in paragraph twenty-nine. Adjusting the core materials, core dimensions, gap distances, and number turns of the windings will tailor the self and mutual inductances to meet the desired set of criteria.

DC current through the first Winding and second Winding can be controlled by the ratio of the first Winding DC resistance and second Winding DC resistance. Similarly, DC current through the third Winding and fourth Winding can be controlled by the ratio of the third Winding DC resistance and fourth Winding DC resistance. Of significance, the windings that carry most of the AC current can be wound using litz type wire that consists of very fine individual wires, and the windings that carry little AC current need not be made with expensive heavy gauge litz wire.

Test Methods

Applicant discloses a test method of a high power stacked flux cancelling inductor. After a High Power Stacked Flux Cancelling Inductor is assembled using the previously described process, the self and mutual inductor parameters can be measured using a standard LCR meter to meet the desired criteria. Each self inductance and mutual inductance property can be determined using a Keysight Technologies, E4980A Precision LCR Meter following the procedure outlined in the Keysight Technologies E4980A/AL Precision LCR Meter User's Guide, Inductance Measurements Section. In situ measurements using an oscilloscope from Teledyne Lecroy, to measure inductor currents and differentially measure inductor voltages, can verify equations of Claim 1 are satisfied. Suppliers of such instruments are Keysight Technologies of 1900 Garden of the Gods Road, Colorado Springs, CO 80907-3423 and Teledyne LeCroy of 700 Chestnut Ridge Road, Chestnut Ridge, NY 10977-6499.

EXAMPLES

The following example embodiments illustrate the particular properties and advantages of the present invention. Furthermore, these are examples of reduction to practice of the present invention and confirmation that the principles described in the present invention are therefore valid but should not be construed as in any way limiting the scope of the invention.

Example One embodiment similar to that shown in Error! Reference source not found. was constructed using the process described above with nanocrystalline material for Core piece 1A, Core piece 1B, and a ferrite material for Core piece 2A, and Core piece 2B to attain the constraints of Claim 1, Criteria 1. Said example was constructed with 22 turns for the first Winding and third Winding; The second Winding and fourth Winding each were 11 turns. Measured self and mutual inductances of Example One:

$L_1=L_3=161$ µH $L_2=L_4=62.5$ µH $M_{12}=64.7$ µH $M_{13}=110.3$ µH $M_{14}=54.6$ µH $M_{24}=52.4$ µH

From these values, experimentation in DC-DC converter applications indicated the AC portions of $i_{1ac}$, and $i_{3ac}$ were very negligible as illustrated in Error! Reference source not found.

Example Two embodiment, again similar to that shown in Error! Reference source not found, was constructed using the process described above with ferrite material for Core piece 1A, Core piece 1B, Core piece 2A, and Core piece 2B to attain the constraints of Claim 1, Criteria 1. Said example was constructed with 14 turns for the first Winding and third Winding; The second Winding and fourth Winding were each seven turns. Measured self and mutual inductances of Example Two:

$L_1=L_3=64.5$ µH $L_2=L_4=29.2$ µH $M_{12}=27.6$ µH $M_{13}=44.7$ µH $M_{14}=23.3$ µH $M_{24}=24.3$ µH

From these values, experimentation in DC-DC converter applications indicated the AC portions of $i_{1ac}$, and $i_{3ac}$ were negligible.

The aforementioned example embodiments were tested for DC-DC converter applications. Such a converter is suitable for electrical generation, conditioning, and distribution subsystems, within vehicle power conditioning subsystems, hybrid and/or electric vehicle charging stations, motor drives, renewable energy conditioning, laser/maser drives, telecommunication transmission power conditioning, or wireless power transmission power conditioning. The example embodiments are equally appropriate for inverter and current sensing functions.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. An inductor comprising
   a) a first core comprising a core piece 1A and a core piece 1B and a second core comprising a core piece 2A and a core piece 2B, said first core being stacked on said second core, and separated from said second core by a dielectric material, said inductor comprising a gap between Core piece 1A and Core piece 1B and a gap between Core piece 2A and Core piece 2B; and
   b) a first winding, a second winding, a third winding and a fourth winding, two of said four windings being bulk AC conducting windings and the remaining two of said four windings being bulk DC conducting windings; and when a current comprising a DC current and an AC current is supplied to said inductor:
      (i) said bulk DC conducting windings conducting at least 51%, of said DC current;
      (ii) said bulk AC conducting windings conducting at least 51%, of said AC current and any of said current's DC current not conducted by said bulk DC conducting windings, and
      (iii) said bulk DC conducting windings conducting any of said current's AC current not conducted by said bulk AC conducting windings;
   said windings each independently having a resistivity at 20° C. of from about $1.5 \times 10^{-8}$ Ohm-m to about $1.1 \times 10^{-6}$ Ohm-m, said windings being wound around said cores such that the following inductor conditions are met:

Equation For Said First Winding $$V_1 = L_1 \frac{di_1}{dt} + M_{12}\frac{di_2}{dt} - M_{13}\frac{di_3}{dt} - M_{14}\frac{di_4}{dt}$$

-continued

Equation For Said Second Winding $$V_1 = M_{12}\frac{di_1}{dt} + L_2\frac{di_2}{dt} - M_{23}\frac{di_3}{dt} - M_{24}\frac{di_4}{dt}$$

Equation For Said Third Winding $$V_2 = -M_{13}\frac{di_1}{dt} - M_{23}\frac{di_2}{dt} + L_3\frac{di_3}{dt} + M_{34}\frac{di_4}{dt}$$

Equation For Said Fourth Winding $$V_2 = -M_{14}\frac{di_1}{dt} - M_{24}\frac{di_2}{dt} + M_{34}\frac{di_3}{dt} + L_4\frac{di_4}{dt}$$

wherein for said equations the variables are defined as follows:
$V_1$ is a voltage across said first Winding;
$V_1$ is a voltage across said second Winding;
$V_2$ is a voltage across said third Winding;
$V_2$ is a voltage across said fourth Winding;
$i_1$ is a current in said first Winding;
$i_2$ is a current in said second Winding;
$i_3$ is a current in said third Winding;
$i_4$ is a current in said fourth Winding;
$L_1$ is a self inductance of said first Winding around said Core piece 1A;
$L_2$ is a self inductance of said second Winding around said Core piece 1A and said Core piece 2A;
$L_3$ is a self inductance of said third Winding around said Core piece 1B;
$L_4$ is the self inductance of said fourth Winding around said Core piece 1B and said Core piece 2B;
$M_{12}$ is a mutual inductance between said first Winding and said second Winding;
$M_{13}$ is a mutual inductance between said first Winding and said third Winding;
$M_{14}$ is a mutual inductance between said first Winding and said fourth Winding;
$M_{23}$ is a mutual inductance between said second Winding and said third Winding;
$M_{24}$ is a mutual inductance between said second Winding and said fourth Winding;
$M_{34}$ is a mutual inductance between said third Winding and said fourth Winding; and said self and mutual inductances for said inductor satisfying one of the following set of conditions: Criteria 1 and Criteria 1a; Criteria 1 and Criteria 1b; Criteria 2 and Criteria 2a; or Criteria 2 and Criteria 2b; wherein said Criteria 1, Criteria 1a, Criteria 1b, Criteria 2, Criteria 2a, and Criteria 2b are as follows:

$$L_1 - M_{12} \neq 0, M_{13} - M_{14} \neq 0, \text{ and } \frac{di_1}{dt} = \frac{di_3}{dt} = 0 \quad \text{(Criteria 1)}$$

If $V_1 \neq V_2$, then $\frac{di_2}{dt}$ and $\frac{di_4}{dt}$ are different values and: $(M_{12} - L_2) = (M_{14} - M_{24}) = 0$ (Criteria 1a)

If $V_1 = V_2$, (Criteria 1b)

then $\frac{di_2}{dt} = \frac{di_4}{dt}$ and: $(M_{12} - L_2) = (M_{14} - M_{24})$.

or $$M_{12} - L_2 \neq 0, M_{14} - M_{24} \neq 0, \text{ and } \frac{di_2}{dt} = \frac{di_4}{dt} = 0 \quad \text{(Criteria 2)}$$

If $V_1 \neq V_2$, then $\frac{di_1}{dt}$ and $\frac{di_3}{dt}$ are different values and: $(L_1 - M_{12}) = (M_{13} - M_{14}) = 0$ (Criteria 2a)

If $V_1 = V_2$, (Criteria 2b)

then $\frac{di_2}{dt} = \frac{di_4}{dt}$ and: $(L_1 - M_{12}) = (M_{13} - M_{14})$.

2. The inductor of claim 1 wherein when a current comprising a DC current and an AC current is supplied to said inductor:
   a) said bulk DC conducting windings conducting at least 70% of said DC current;
   b) said bulk AC conducting windings conducting at least 70% of said AC current and any of said current's DC current not conducted by said bulk DC conducting windings, and
   c) said bulk DC conducting windings conducting any of said current's AC current not conducted by said bulk AC conducting windings;
   said windings each independently having a resistivity at 20° C. of from about $1.5 \times 10^{-8}$ Ohm-m to about $4.2 \times 10^{-7}$ Ohm-m.

3. The inductor of claim 1 wherein when a current comprising a DC current and an AC current is supplied to said inductor:
   a) said bulk DC conducting windings conducting at least 90% of said DC current;
   b) said bulk AC conducting windings conducting at least 90% of said AC current and any of said current's DC current not conducted by said bulk DC conducting windings; and
   c) said bulk DC conducting windings conducting any of said current's AC current not conducted by said bulk AC conducting windings;
   said windings each independently having a resistivity at 20° C. of from about $1.5 \times 10^{-8}$ Ohm-m to about $1.4 \times 10^{-7}$ Ohm-m.

4. The inductor of claim 1 wherein when a current comprising a DC current and an AC current is supplied to said inductor:
   a) said bulk DC conducting windings conducting at least 95% of said DC current;
   b) said bulk AC conducting windings conducting at least 99% of said AC current and any of said current's DC current not conducted by said bulk DC conducting windings, and
   c) said bulk DC conducting windings conducting any of said current's AC current not conducted by said bulk AC conducting windings;
   said windings each independently having a resistivity at 20° C. of from about $1.5 \times 10^{-8}$ Ohm-m to about $3.0 \times 10^{-8}$ Ohm-m.

5. The inductor of claim 1 wherein when a current comprising a DC current and an AC current is supplied to said inductor:
   a) said bulk DC conducting windings conducting about from about 51% to about 99% of said DC current
   b) said bulk AC conducting windings conducting from about 51% to about 99.99% of said AC current and any of said current's DC current not conducted by said bulk DC conducting windings, and
   c) said bulk DC conducting windings conducting any of said current's AC current not conducted by said bulk AC conducting windings;

said windings each independently having a resistivity at 20° C. of from about 1.5×10−8 Ohm-m to about 1.1×10−6 Ohm-m.

6. The inductor of claim 1 having DC magnetic fluxes induced by said four windings wherein:
   a) said core piece 1A having a first DC magnetic flux having a direction induced by one of said two of said four windings and a second DC magnetic flux having a direction induced by one of said two other windings, said one of said two of said four windings and one of said two other windings being wound such that for said inductor the first DC magnetic flux in said core piece 1A induced by one of said two of said four windings is of the same direction as the second DC magnetic flux in Core piece 1A induced by one of said two other windings;
   b) said core piece 1B having a first DC magnetic flux having a direction induced by one of said two of said four windings and a second DC magnetic flux having a direction induced by one of said two other windings, said one of said two of said four windings and one of said two other windings and being wound such that for said inductor the first DC magnetic flux in said core piece 1B induced by one of said two of said four windings is of the same direction as the second DC magnetic flux in Core piece 1B induced by one of said two other windings,
   c) said Core piece 1A has a total DC magnetic flux having a direction and Core piece 1B has a total DC magnetic flux having a direction and two of said four windings and said two other windings are wound such that for said inductor the DC magnetic flux direction of said total flux induced in Core piece 1A and the DC magnetic flux direction of said total flux induced in Core piece 1B at the gap between Core piece 1A and Core piece 1B are in opposition; and
   d) said Core piece 2A has a total DC magnetic flux having a direction and Core piece 2B has a total DC magnetic flux having a direction and two of said four windings and said two other windings being wound such that for said inductor the DC magnetic flux direction of said total flux induced in Core piece 2A and the DC magnetic flux direction of said total flux induced in Core piece 2B at the gap between Core piece 2A and Core piece 2B are in opposition.

7. The inductor of claim 1 wherein said first and second cores comprise a material selected from the group consisting of soft magnetic materials, air and mixtures thereof.

8. The inductor of claim 1 wherein said first and second cores comprise a soft magnetic material that comprises a material selected from the group consisting of a ferrimagnetic material, a ferromagnetic material and mixtures thereof.

9. The inductor of claim 1 wherein said first and second cores comprise a material selected from the group consisting of powder metals, solid metals, amorphous metal ribbon, ceramics and mixtures thereof.

10. The inductor of claim 1 wherein said first and second cores comprise a material selected from the group consisting of ferrites, nanocrystalline materials and mixtures thereof.

11. The inductor of claim 1 wherein said first, second, third and fourth windings comprise an electrically conductive material.

12. The inductor of claim 1 wherein said first, second, third and fourth windings comprise an electrically conductive material selected from the group consisting of metals, superconductors, semiconductors, graphite, conductive polymers and mixtures thereof.

13. The inductor of claim 1 wherein said first, second, third, and fourth windings comprise an electrically conductive material selected from the group consisting of transition metals, post-transition metals, carbon fiber and mixtures thereof.

14. The inductor of claim 1 wherein said first, second, third, and fourth windings comprise an electrically conductive material selected from the group consisting of copper, aluminum, gold, silver and mixtures thereof.

15. The inductor of claim 1, said inductor having a DC flux cancellation of from about 20% to about 95%.

16. The inductor of claim 1, said inductor having a DC flux cancellation of from about 40% to about 95%.

17. The inductor of claim 1, said inductor having a DC flux cancellation of from about 50% to about 90%.

18. The inductor of claim 1, said inductor having a DC flux cancellation of from about 75% to about 90%.

19. The inductor of claim 1, said inductor having a ratio of AC to DC current in each of said bulk AC conducting windings of from about 1:1 to about 1000000:1.

20. The inductor of claim 1, said inductor having a ratio of AC to DC current in each of said bulk AC conducting windings from about 2:1 to about 10000:1.

21. The inductor of claim 1, said inductor having a ratio of AC to DC current in each of said bulk AC conducting windings from about 3:1 to about 1000:1.

22. The inductor of claim 1, said inductor having a ratio of AC to DC current in each of said bulk AC conducting windings from about 4:1 to about 100:1.

23. An article comprising an inductor according to claim 1, said article being selected from the group consisting of electrical current measurement or power converter/inverters.

* * * * *